Aug. 16, 1932.   H. A. WINNE   1,871,437
CONTROL SYSTEM FOR ROLLING MILLS
Filed Jan. 21, 1931
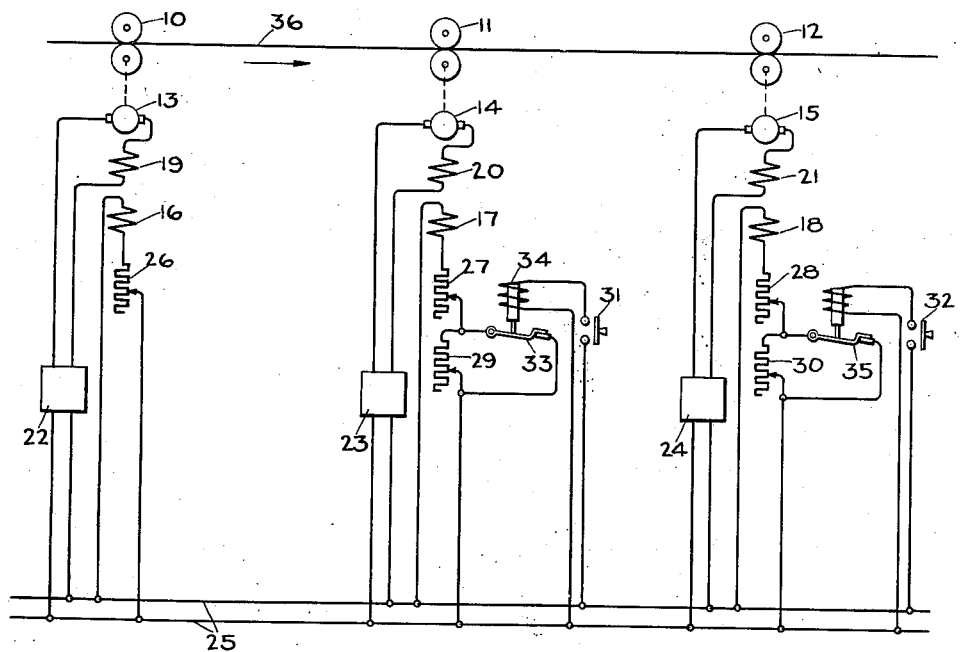
Inventor:
Harry A. Winne,
by Charles O. Mullar
His Attorney.

Patented Aug. 16, 1932

1,871,437

UNITED STATES PATENT OFFICE

HARRY A. WINNE, OF SCHENECTADY, NEW YORK, ASSIGNOR TO GENERAL ELECTRIC COMPANY, A CORPORATION OF NEW YORK

CONTROL SYSTEM FOR ROLLING MILLS

Application filed January 21, 1931. Serial No. 510,314.

My invention relates to control systems for rolling mills and the like, more particularly to control systems for motors driving a plurality of metal rolling or reducing stands in tandem, such as used in the continuous rolling of strip steel, and has for its object the provisions of simple and reliable means for taking up slack in the material between stands.

In the operation of metal rolling mills such as mills for rolling cold strip steel two or more, usually four, roll stands or pairs of rolls are provided, each being driven by an individual, adjustable speed motor. The relative speed adjustment of the motor is such that any slack due to elongation of the material in passing through the rolls is taken up and also a slight tension is maintained in the material between each pair of rolls. Regulating means is provided for maintaining this predetermined speed relation between the motors. Where direct current motors are used a cumulative compound series field winding is sometimes provided on some or all of the motors for this purpose.

Since the strips are of limited length, perhaps several hundred feet, it is necessary at frequent intervals to start a new strip through the pairs of rolls or stands. This results in a certain amount of slack between the rolls which heretofore has been taken up by disturbing the original speed adjustment of all the motors except the one driving the first pair of rolls so as to temporarily increase their speeds, after which their speeds must be carefully readjusted as before.

In accordance with my invention I provide means for individually and temporarily varying the speeds of certain of the motors to take up the slack without disturbing the adjustment of the speed regulating means.

For a more complete understanding of my invention, reference should be had to the accompanying drawing in which the single figure shows in diagrammatic form a system of control for rolling mills embodying my invention.

Referring to the drawing, I have shown my invention in one form as applied to a plurality of pairs of rolls, or roll stands, three stands 10, 11 and 12 being shown. It will be understood, however, that my invention has various applications in the driving of a plurality of devices for the continuous treatment of metal or other material, for example, to vary or reduce its cross section. The stands are driven respectively by suitable electric motors 13, 14 and 15 which are shown as direct current motors provided respectively with shunt field windings 16, 17 and 18 and cumulative compound series field windings 19, 20 and 21. Suitable switching mechanisms 22, 23 and 24 are provided respectively in the armature circuits of the motors to control their connection to a suitable direct current electrical supply source 25 whereby the motors may be started and stopped. In series with the shunt field windings 16, 17 and 18 are adjustable resistances 26, 27 and 28 respectively whereby the speed of each motor may be adjusted as desired.

In order to provide for a temporary change in speed of the motors 14 and 15 additional normally short-circuited resistances 29 and 30 are provided in the circuits of the field windings 17 and 18. The short circuits around these resistances may be opened by closing the normally open push button switches 31 and 32 whereby the short circuits are maintained open as long as the push buttons are held depressed. As shown the resistance 29 is normally short-circuited by a normally closed switch 33 provided with an operating coil 34, the circuit of which may be closed to open the switch by means of the push button switch 31. A similar short-circuiting switch 35 operated by the push button switch 32 is provided for the resistance 30.

In the operation of the system the adjustable resistances 26, 27 and 28 in the shunt field circuits of the motors are adjusted to give the desired speed setting for each motor so as to maintain a predetermined slight tension on the material between the roll stands. Assuming that the strip of metal 36 passes first into the roll stand 10, moving from the left to the right as seen in the drawing, the motor 13 will be adjusted by means of the resistance 26 to have some desired base speed. It will be understood that in passing through the rolls the material is elongated somewhat so that the speed of each successive pair of rolls must be somewhat higher than the preceding pair in order to take up the slack. The speed adjustments of the motors 14 and 15 are accordingly such that the stands 11 and 12 are driven at successively higher speeds, and furthermore such that these motors tend to run at still higher speeds so as to apply a slight tension in the material between the stands. The resistances 29 and 30 are also adjusted to give a desired increase in speed when the button for that particular motor is pressed. The cumulative series fields act as a regulating or stabilizing means for the motors so as to maintain their original speed settings. Although not indispensable, the series field 19 on the motor 13 may improve the operation of the equipment. Thus any tendency for a change in the speed of either of these motors, for example due to a change in its load, results in a corresponding corrected change in its series field. Instead of the series fields, suitable current responsive regulating means may also be provided for maintaining constant loads on the motors.

In starting a strip through the rolls, it will be observed that after it has been started through the first stand 10, for example, a certain amount of slack forming a loop necessarily accumulates while it is being started through the next stand 11 and likewise a certain amount of slack is accumulated in the form of a loop between the stands 11 and 12 while it is being started through the stand 12. In order to take up this slack the operator depresses the push buttons 31 and 32 for these stands whereby the speeds of their driving motors are temporarily increased. When the slack has been taken up, the particular button is released whereupon the original speed of the motor is reestablished.

What I claim as new and desire to secure by Letters Patent of the United States, is,—

1. The combination with a plurality of stands for the continuous treating of strip material, separate driving means for each of said stands, means for adjusting the speeds of said driving means to establish a predetermined speed relation between them, means for maintaining said predetermined speed relation, a switch manually operable to a predetermined position for temporarily increasing the speed of certain of said motors to take up slack in the lengths of material between said stands and means for biasing said switch to another position to reestablish said predetermined speed relation.

2. A control system for apparatus including a plurality of stands for treating strip material, means for driving said stands whereby a strip of material is passed continuously through the stands, regulating means for maintaining a predetermined speed adjustment between said motors, and push button controlled means operating independently of said regulating means for temporarily increasing the speed of certain of said motors to take up slack in the material between said stands.

3. A control system for apparatus including a plurality of roll stands for continuously treating strip material comprising a separate driving motor for each of said stands, means for adjusting the speeds of said motors to establish a predetermined speed relation between them, means for maintaining said speed relation, a resistance in a control circuit for certain of said motors, a normally closed switch for short circuiting each of said resistances, electromagnetic means for opening said switches, and a push button switch for controlling said electromagnetic means to open said short circuit and thereby temporarily increase the speeds of said motors without disturbing said speed adjusting means.

4. A control system for apparatus including a plurality of devices for carrying out a predetermined operation on a length of material passing between them comprising a driving motor for each of said devices, means for adjusting the speed of certain of said motors to establish a predetermined speed relation between them for normal operating conditions and manually operated means independent of said speed adjusting means for automatically changing the speeds of certain of said motors without changing the setting of said speed adjusting means to take up slack in the material between said devices after which said predetermined speed relation is reestablished.

5. A control system for apparatus including a plurality of stands for continuously treating lengths of strip material comprising a separate driving motor for each of said stands, means for adjusting the speeds of certain of said motors to establish a predetermined speed relation between them for normal operating conditions and manually operable means independent of said speed adjusting means biased to one position and movable to another position against its bias to temporarily change the speed of at least one of said motors to take up slack in the material between said stands upon starting a length through them without changing the adjustment of said speed adjusting means, said manually operable means being movable in response to its bias to reestablish said predetermined speed relation.

6. The method of taking up slack in the material between two or more stands driven by separate motors having control means adjusted to maintain a predetermined speed relation between them, which consists in temporarily increasing the speed of certain of said motors throughout a predetermined speed step without disturbing the adjustment of the control means for maintaining said predetermined speed relation and thereafter reestablishing said predetermined speed relation.

In witness whereof, I have hereunto set my hand this twentieth day of January, 1931.

HARRY A. WINNE.